United States Patent [19]

Kaneko

[11] Patent Number: 5,146,581
[45] Date of Patent: Sep. 8, 1992

[54] SUBPROGRAM EXECUTING DATA PROCESSING SYSTEM HAVING BANK SWITCHING CONTROL STORING IN THE SAME ADDRESS AREA IN EACH OF MEMORY BANKS

[75] Inventor: Yutaka Kaneko, Gunma, Japan

[73] Assignee: Sanyo Electric Co., Ltd., Osaka, Japan

[21] Appl. No.: 313,677

[22] Filed: Feb. 22, 1989

[30] Foreign Application Priority Data

| | | | |
|---|---|---|---|
| Feb. 24, 1988 | [JP] | Japan | 63-41535 |
| Feb. 24, 1988 | [JP] | Japan | 63-41536 |
| May 19, 1988 | [JP] | Japan | 63-122313 |
| May 26, 1988 | [JP] | Japan | 63-129052 |

[51] Int. Cl.$^5$ .................... G06F 12/00; G06F 13/10
[52] U.S. Cl. ................ 395/425; 364/DIG. 1;
364/238.4; 364/244; 364/246.4; 364/254.3;
364/254.4; 364/246.1; 364/957.1; 364/957.2;
364/965.2; 364/966.3; 364/966.6; 364/966.7
[58] Field of Search ... 364/200 MS File, 900 MS File

[56] References Cited

U.S. PATENT DOCUMENTS

| | | | |
|---|---|---|---|
| 3,737,860 | 6/1973 | Sporer | 364/200 |
| 3,866,182 | 2/1975 | Yamada et al. | 364/200 |
| 4,340,932 | 7/1982 | Bakula et al. | 364/200 |
| 4,368,515 | 1/1983 | Nielsen | 364/200 |
| 4,481,570 | 11/1984 | Wiker | 364/200 |
| 4,503,491 | 3/1985 | Lushtak et al. | 364/200 |
| 4,713,759 | 12/1987 | Yamagishi et al. | 364/200 |
| 4,725,945 | 2/1988 | Kronstadt et al. | 364/200 |
| 4,744,048 | 5/1988 | Blanset et al. | 364/900 |
| 4,755,935 | 7/1988 | Daub et al. | 364/200 |
| 4,799,186 | 1/1989 | Ployette | 364/900 |
| 4,914,575 | 4/1990 | Kihara et al. | 364/200 |
| 4,930,066 | 3/1990 | Yokota | 364/200 |
| 4,933,846 | 6/1990 | Humphrey et al. | 364/200 |
| 4,949,298 | 8/1990 | Nakanishi et al. | 364/900 |

Primary Examiner—Thomas C. Lee
Assistant Examiner—Krisna Lim
Attorney, Agent, or Firm—Armstrong, Nikaido, Marmelstein, Kubovcik & Murray

[57] ABSTRACT

An apparatus for executing a subroutine and an interrupt processing routine of a bank switching scheme has a plurality of memory banks (4, 5, 6), a program for controlling bank switching being stored in the same address space (90) in each of the plurality of memory banks. When there is a necessity of switching the banks to the second memory bank (5) or (6) during the execution of a processing program in the first memory bank (4) to execute a subprogram, the bank switching control program in the first memory bank is called so that switching is performed from the first memory bank to the second memory bank, and the bank switching control program in the second memory bank is called. The subprogram is called in accordance with this bank switching control program in the second memory bank. After the execution of this subprogram is completed, the bank switching control program in the second memory bank is called again, so that switching is performed from the second memory bank to the first memory bank and the bank switching control program in the first memory bank is called. The return to the original processing program is made in accordance with the bank switching control program in the first memory bank. In the above described scheme, the necessity of efficiently utilizing a memory area and address matching of the processing program and the subprogram can be eliminated.

17 Claims, 11 Drawing Sheets

SUBPROGRAM EXECUTING DATA PROCESSING SYSTEM HAVING BANK SWITCHING CONTROL STORING IN THE SAME ADDRESS AREA IN EACH OF MEMORY BANKS

BACKGROUND OF THE INVENTION

1. Field of the Invention

The present invention relates generally to an apparatus of and a method for executing a subprogram, and more particularly, to an apparatus of and a method for executing a subroutine and an interrupt processing program in a system having a program memory comprising two or more memory banks.

2. Description of the Background Art

A program is required in order to cause a data processing system to perform a predetermined data processing operation. Therefore, an ordinary data processing system comprises, as its most simplified manner, a main memory for storing various data, a user program applied from an external apparatus, or the like, a program memory for fixedly storing a program inherent in this processing system, or the like, and a central processing unit (CPU) for performing data processing in accordance with the programs.

However, as the data processing system is made to perform a multi-function, the scale of each of the processing programs is enlarged, so that a memory area for storing the processing programs is increased. In this case, since memory capacity of the CPU is defined by the number of address bits which can be utilized by the CPU, the large-scale processing programs cannot be all stored in the memory area. In order to deal with this, a memory bank switching scheme has been put into practice in which a plurality of memory banks are provided and the memory banks are switched so that a memory area in the CPU is extended. On this occasion, different processing programs are stored in the respective memory banks. Switching of the memory banks is generally performed in accordance wit a control program exclusively used for bank switching stored in a common area of a main memory provided separated from the memory banks.

However, in a relatively small capacity system in which restrictions are imposed on a program are from the viewpoint of its memory capacity and such a common area cannot be provided in a main memory, it is necessary to cause processing programs in memory banks to control bank switching. Japanese Patent Laying-Open Gazette No. 120543/1987 discloses an example of such bank switching. Referring now to FIG. 1, description is made on a conventional bank switching method disclosed in this gazette.

Referring to FIG. 1, it is assumed that each of banks A and B has addresses 0000H to FFFFH, and a memory area having addresses 0000H to 1FFFH is assigned for programs. In addition, it is assumed that this data processing system is a system of a pre-fetch scheme of fetching the next instruction during the execution of an instruction.

First, the bank A is accessed by the CPU, so that steps (instructions) of the programs stored therein are sequentially read out and executed. When the program advances to an address x so that an instruction of bank switching stored thereat is read out and executed, a memory bank to be accessed is switched from the bank A to the bank B. This bank switching is performed by an additional bit to an address. More specifically, a combination of this additional bit and a counted value of an address counter (program counter) for addressing becomes a bank address. For example, an additional bit for the bank A is "0", and an additional bit for the bank B is "1". The bank A is accessed in the case of addresses 00000 to 0FFFF, while the bank B is accessed in the case of addresses 10000 to 1FFFF.

In this bank switching scheme, an additional bit (stored in a suitable position of a memory, practically in an extended address register) is updated by the instruction of bank switching, so that bank switching is achieved. However, a program counter is not changed in the count value. Thus, a memory access address outputted by the program counter becomes an address $x, x+1, x+2 \ldots$. Therefore, in the bank B, program instructions stored in the address $x+2$ and subsequent addresses in the bank B are sequentially executed. Meanwhile, since a system of a pre-fetch scheme is here assumed, an instruction of bank switching read out by accessing to the address x in the bank A is executed at timing at which the next address $x+1$ is accessed, so that bank switching is achieved. On this occasion, since an instruction read out at the address $x+1$ is an instruction in the bank A and is not required, an instruction "NOP" (no operation) is stored at the address $x+1$ in the bank A. As a result, no instruction is executed at timing at which the address $x+2$ is accessed, and an instruction from the address $x+2$ (represented by the hatched portion in FIG. 1) in the bank B is only read out. When the address $x+3$ is accessed, an instruction at the address $x+2$ in the bank B is executed.

Thus, if this bank switching scheme is applied to the execution of a subroutine, the following problems occur. Conventionally, a program technique of storing a program repeatedly used in separate memory area as a subroutine and calling this subroutine as needed has been known, in order to avoid the redundancy of a program and efficiently utilize a program area. Let us consider a case in which a subroutine in one memory bank is called from a main routine in the other memory bank and executed, in the above described bank switching scheme. In this case, in a plurality of portions where a main routine attempts to call a subroutine, address matching of a bank switching address of the main routine and a first address of the subroutine is required, so that a considerable amount of time and effort is required to develop a program. Therefore, the efficiency of this system is poor.

Additionally, if and when the number of subroutines to be called is large (there are many types of subroutines), the restriction that address matching is required brings about a situation where a program which is a desired end cannot be developed. In addition, considering a case in which three or more memory banks are provided, if the above described bank switching scheme is applied, the same difficulty arises, so that it is almost impossible to, for example, nest the subroutines.

In order to overcome such a difficulty, it is necessary to store all the subroutines as required in each of the memory banks. However, in this case, memory capacity required in each of the memory banks is increased, so that all desired programs cannot be stored in a limited program memory area.

Additionally, a processing program similar to a subroutine includes an interrupt processing routine. This interrupt processing routine is similar to the subroutine in that it is an independent program stored in a memory area other than an area for the main routine, while being entirely different from the subroutine in that it is not related to the content of processing of the main routine. In the following description, the subroutine and the interrupt processing routine are generically referred to as a subprogram in the sense that they are a separate program from the main routine.

An interrupt control method in the memory bank switching scheme is disclosed in, for example, Japanese Patent Laying-Open Gazette No. 30050/1982. In this prior art document, an interrupt processing program or a bank control program for interruption for designating a particular memory bank storing the interrupt processing program, a bank address or the like are stored in a common memory area provided separately from a plurality of memory banks. Interrupt processing is performed in accordance with a processing program stored in this common memory area and/or a particular memory bank.

This prior art scheme cannot be applied to a system in which a region for storing a program associated with interrupt processing cannot be provided in a common memory area provided separately from memory banks, on a designing view of a system or depending on memory capacity of the system. Thus, in such a system, the same interrupt processing program is forced to be stored in each of the memory banks. This causes the interrupt processing program to unnecessarily occupy a memory area extended by the memory bank switching scheme, so that a memory area for storing a desired processing program becomes narrow.

Additionally, the above described Japanese Patent Laying-Open Gazette No. 120543/1987 has proposed a method for designating a jump address using an instruction JMP (jump) in place of an instruction NOP subsequent to an instruction of bank switching to eliminate the necessity of address matching in the memory bank switching scheme. However, in this prior art method, the jump address is designated only using the instruction JMP after bank switching step, and designation of a return address or the like is not considered at all. In addition, in a general CPU, it is not ensured that actual switching of memory banks is completed after the execution of the instruction JMP. Thus, this method makes it difficult to perform a reliable operation. Thus, this prior art method cannot be applied to a subroutine executing method and an interrupt processing method in a system of a memory bank switching scheme.

SUMMARY OF THE INVENTION

An object of the present invention is to provide a data processing apparatus of a memory bank switching scheme in which a program including switching of memory banks can be stored without consideration of address matching of the memory banks.

Another object of the present invention is to provide a data processing apparatus of a bank switching scheme in which a program including switching steps of memory banks can be efficiently stored in a restricted memory area.

Still another object of the present invention is to provide a data processing apparatus of a bank switching scheme in which a subroutine and an interrupt handling subroutine requiring switching of memory banks can be arranged in an arbitrary memory bank.

Still another object of the present invention is to provide a subroutine executing apparatus of a bank switching scheme in which a subroutine in an arbitrary memory bank can be called from an arbitrary memory bank and the return to the original memory bank can be made.

Still another object of the present invention is to provide an interrupt processing executing apparatus of a bank switching scheme in which a program area can be efficiently utilized.

Still another object of the present invention is to provide a subprogram executing method in a data processing apparatus of a bank switching scheme by which a subprogram can be called and the return can be made between arbitrary memory banks.

Still another object of the present invention is to provide a method for executing a subroutine and an interrupt processing program in a data processing apparatus of a memory bank switching scheme by which a memory area can be efficiently utilized.

Still another object of the present invention is to provide a subroutine executing method by which the execution time of a program requiring a subroutine requiring switching of memory banks can be shortened.

A further object of the present invention is to provide a subprogram executing method including bank switching by which the same bank switching control program can be used commonly to a plurality of subprograms.

A still further object of the present invention is to provide a subprogram executing method including bank switching by which memory banks can be switched in a few processing steps.

The data processing apparatus of a bank switching scheme according to the present invention has a plurality of memory banks, a bank switching control program being stored in a memory area with the same addresses in each of the plurality of memory banks.

In each step of this bank switching control program, address matching is achieved among memory banks.

The subprogram executing method according to the present invention comprises the steps of switching memory banks and reading out a bank switching control program in a second memory bank in accordance with a bank switching control program in a first memory bank when the execution of a subprogram in the second memory bank is required during the execution of a processing program in the first memory bank, calling a required subprogram in accordance with the read-out bank switching control program in the second memory bank, returning to the bank switching control program in the second memory bank after the execution of this required subprogram is completed, switching the memory banks from the second memory bank to the first memory bank and reading out the bank switching control program in the first memory bank in accordance with the returned bank switching control program in the second memory bank, and returning to the original processing program in accordance with the read-out bank switching control program in the first memory bank.

In the above described scheme, a bank switching control program is stored only in the same address space in each of the memory banks, and switching of the memory banks, calling of the subprogram and the return to the original processing program are achieved in accordance with this bank switching control program. Thus, address matching of the main program and the subprogram need not be considered, so that the subprogram can be arranged in arbitrary address positions of the memory bank. Thus, the memory area can be efficiently utilized and the program development time can be shortened.

Particularly, in a scheme in which one type of bank switching control program common to a plurality of subprograms is utilized, the memory area can be utilized more efficiently.

Additionally, in a scheme in which a bank switching control routine is provided for each subprogram, the memory banks can be switched in a few processing steps, i.e., at high speed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
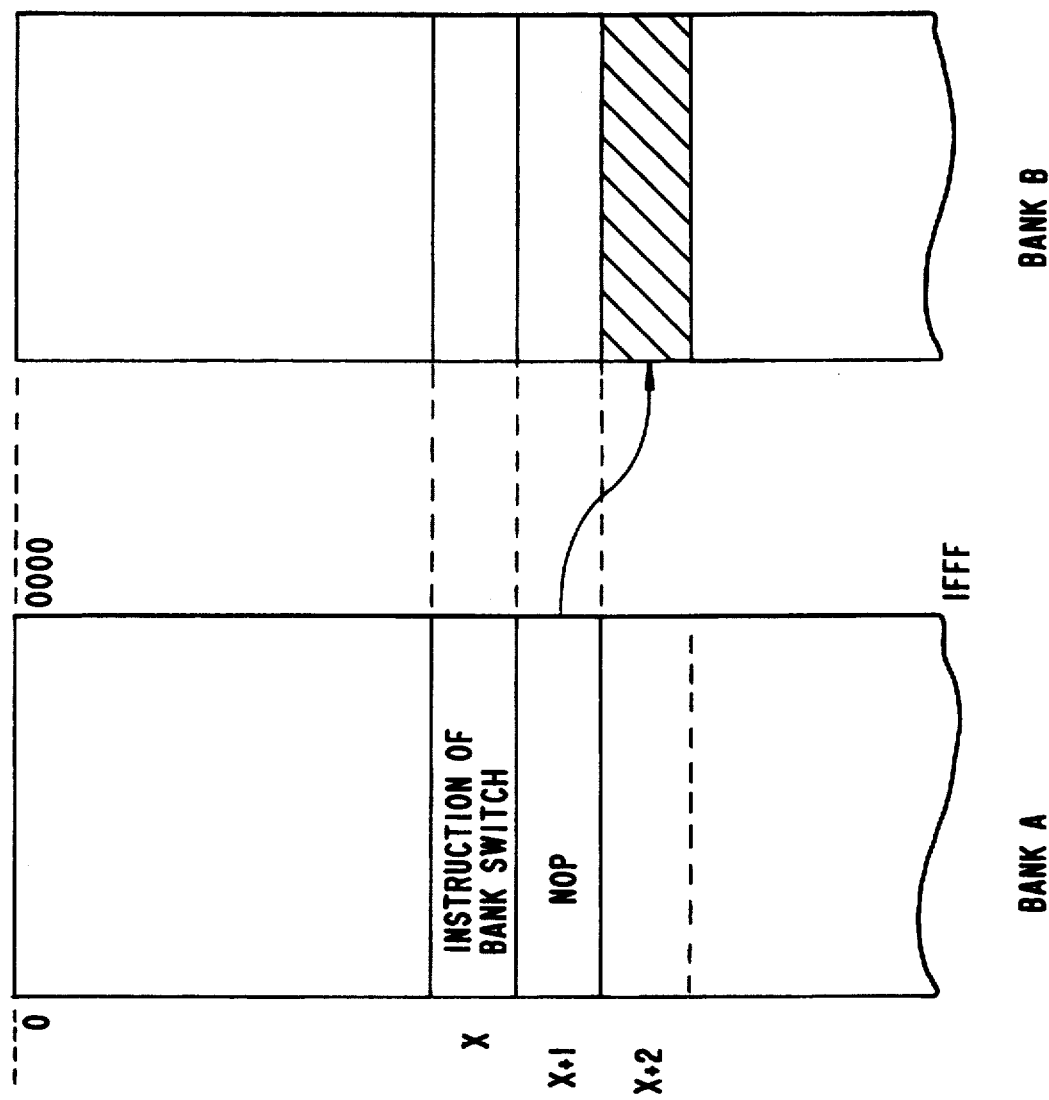
FIG. 1 is a diagram showing schematically a system with a conventional bank switching scheme.

Referring now to the drawings, description is made on a subprogram executing scheme in a data processing system with a memory bank switching scheme, in the order of a subroutine and an interrupt handling routine.

Figure 2:
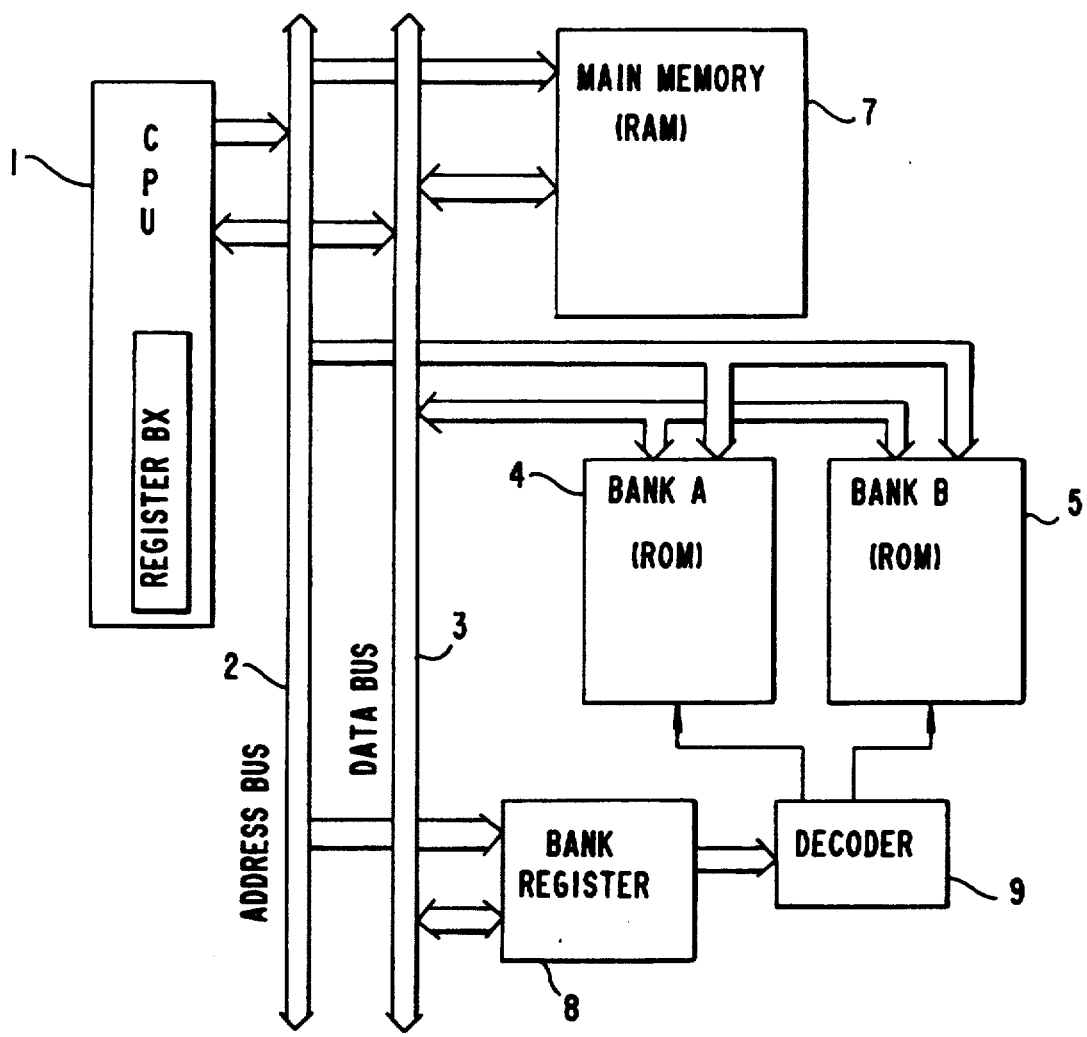
FIG. 2 is a diagram showing schematically a configuration of a system with a bank switching scheme according to one embodiment of the present invention.

FIG. 2 shows a schematic configuration of a main portion of a data processing system of a memory bank switching scheme according to a first embodiment of the present invention. Referring to FIG. 2, a data processing system comprises a CPU 1 for performing data processing, a control operation or the like in accordance with an applied program, memory banks A4 and B5 for respectively storing a predetermined processing program, and a main memory 7 for storing various data, a user program loaded from an external apparatus (not shown), or the like.

For the CPU 1, a commercially available 16-bit 8086 made by Intel Corp. is employed by way of example. The memory bank A4 comprises a read only memory (ROM), which fixedly stores a predetermined first processing program inherent in the system. Similarly, the memory bank B5 comprises a ROM, which fixedly stores a second processing program inherent to the system. The main memory 7 comprises a random access memory (RAM) such that the content thereof can be updated. There is provided a register area for temporarily storing the content read out from the memory banks A4 and B5 and the main memory 7. This register area, which is shown as a register BX in the following description of the operation, is provided in the CPU 1 as shown or, otherwise, is allotted in a predetermined region of the main memory 7.

In order to switch memory banks, there are provided a bank register 8 for storing bank designation data for specifying a bank to be accessed, and a decoder 9 for selecting any one of the memory banks A4 and B5 depending on the content of the bank register 8 to bring the selected bank to an enable state.

The decoder 9 has a general configuration, i.e., comprises a decoder of a NOR type or a NAND type. Although in the above described system configuration the memory banks A and B respectively comprise ROMs 4 and 5, the memory banks A and B may be provided on a single ROM chip.

Figure 3:
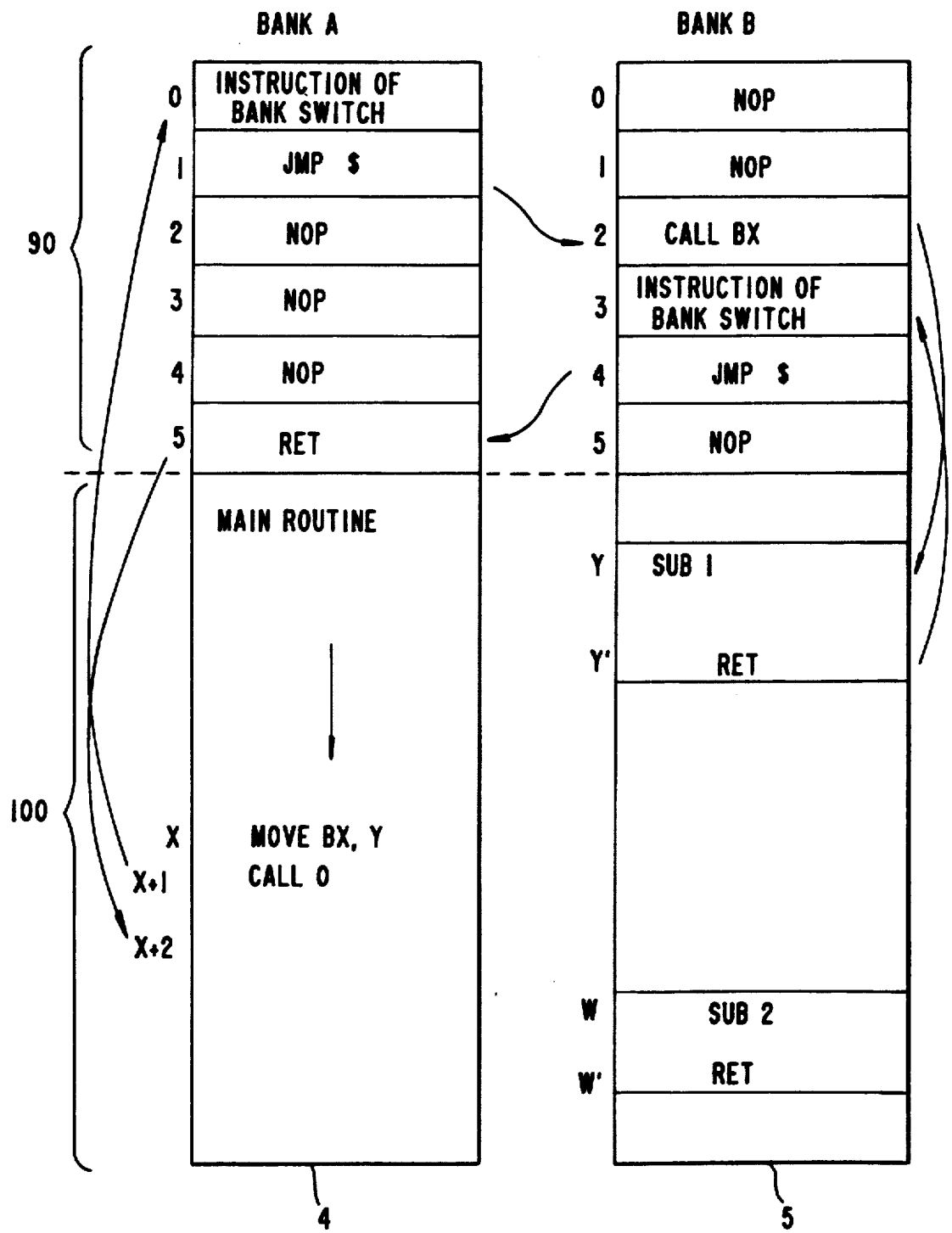
FIG. 3 is a diagram showing schematically the contents stored in memory banks in a subroutine executing scheme using the system shown in FIG. 2.

Referring now to FIG. 3, description is made on the contents respectively stored in the memory banks A and B.

Each of the memory banks A4 and B5 comprises an area 90 for storing a bank switching control program (referred to as a bank switching manager hereinafter), and an area 100 for storing a predetermined processing program. The same address area (addresses 0 to 5 in FIG. 3) in each of the memory banks A4 and B5 is assigned to the area 90. The processing program storing areas 100 in the memory banks A4 and B5 store different processing programs. In order to transfer internal data and addresses, there are provided a data bus 2 and an address bus 3.

Referring now to FIGS. 2 and 3, description is made on an operation in which a subroutine in the memory bank B5 is called from a main routine in the memory bank A4 and executed. In FIG. 3, the operation flow is represented by arrows.

In the memory area 100 in the memory bank B5, a plurality of subroutines SUB 1, SUB 2, . . . are stored in address positions independent of an address at which a subroutine call instruction CALL of the main routine in the memory bank A4 is stored.

In the main routine in the memory bank A4, an instruction MOV BX, Y for transferring the content of a start address Y of a subroutine SUB 1 to the register BX (provided in the CPU 1 or the RAM 7, in FIG. 2 it is included in the CPU 1) is stored at an address X, and an instruction CALL 0 for calling a bank switching manager starting at the address 0 is stored at the next address X+1.

In the bank switching manager in the memory bank A4, an instruction for switching the memory banks from the bank A to the bank B is stored at the address 0, an instruction JMP $ for jumping to the next address by eternal looping is stored at the address 1, an instruction NOP is stored at the respective addresses 2 to 4, and an instruction RET for returning to the main routine after the completion of the subroutine is stored at the address 5.

In a bank switching manager for the memory bank B5, a instruction NOP is stored at the respective addresses 0, 1 and 5, an instruction CALL BX for calling the content of the register BX is stored at the address 2, an instruction of bank switching for switching the memory banks from the bank A to the bank B is stored at the address 3, and an instruction JMP S is stored at the address 4. A subroutine starting at an address set in the register BX is called by the instruction CALL BX at the address 2.

Let us consider a case in which the main routine in the memory bank A4 is executed and a program step reaches the address X. Data indicating an address Y is set in the register BX by the MOV instruction at the address X. Then, the content of the address 0 in the memory bank A4 is called by the CALL instruction at the address X+1, so that bank switching is performed from the memory bank A to the memory bank B. Subsequently, the JMP instruction at the address 1 in the memory bank A4 is read out. A pre-fetch scheme is here assumed as the system. The JMP S instruction at the address 1 in the memory bank A4 is read out during the execution of the bank switching instruction at the address 0 in the memory bank A4 and held in an instruction register (not shown). Thus, an instruction to be next executed after switching of the memory banks is the content of the address 1 in the memory bank A4. The CPU 1 sets bank designation data of the memory bank B5 by the bank switching instruction and writes the same in the bank register 8, and the decoder 9 decodes the data set in this bank register 8 to disable the memory bank A4 and enable the memory bank B5, so that bank switching is achieved. In this case, since the system is of a pre-fetch scheme, this substantial bank switching is completed during the execution of the instruction JMP S at the address 1 in the memory bank A4. Thus, the instruction CALL BX at the address 2 in the memory bank B4 is executed after the instruction JMP S. The address Y which has been already stored in the register BX is read out by this CALL instruction, so that the subroutine SUB 1 starting at this address Y is executed. When the subroutine SUB 1 is completed and the step advances to an address Y', the bank switching instruction at the address (address 3) subsequent to the CALL instruction in the memory bank B5 is executed, so that bank switching is performed from the memory bank B5 to the memory bank A4 under the control of the CPU 1. Subsequently, the instruction RET at the address 5 in the memory bank A4 is then executed by the instruction JMP S at the address 4 in the memory bank B5. The content of the next address (address X+2) subsequent to the CALL instruction in the memory bank A4 is read out and executed. Consequently, the return to the main routine in the memory bank A4 is completed, so that the program of this main routine are sequentially executed.

If and when the main routine in the memory bank A4 calls the subroutine SUB 2 in the memory bank B5, it is necessary to transfer a start address W in the subroutine SUB 2 to the register BX using the MOV instruction.

In order to call the subroutine in the memory bank A4 from the main routine in the memory bank B5 and call the subroutines mutually by both the memory banks A4 and B5, an area for a bank switching manager is extended by two times of that shown in FIG. 3, to store the same switching manager as the bank switching manager (addresses 0 to 5) of the memory bank A4 in this extended area of the memory bank B5 and store the same switching manager as the bank switching manager shown in FIG. 3 of the memory bank B5 in the extended area of the memory bank A4. On this occasion, an instruction MOV for calling a subroutine and an instruction CALL for calling the bank switching manager stored in the extended area are stored in the main routine in the memory bank B5, as in the main routine in the memory bank A4.

Description is now made on a structure in which three or more memory banks are provided and a subroutine is called and executed among the three or more memory banks.

Figure 4:
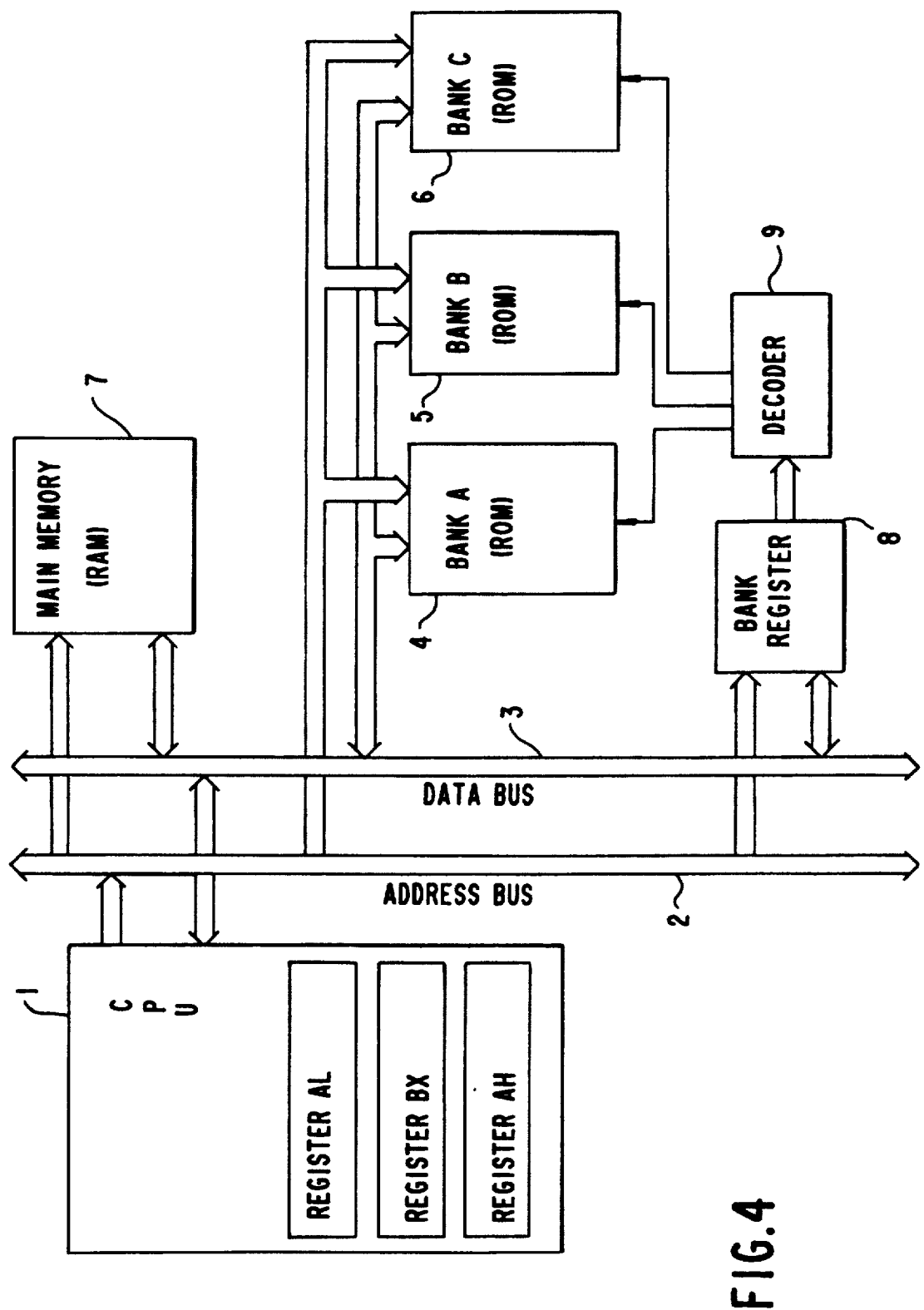
FIG. 4 is a diagram showing schematically a configuration of a system of a bank switching scheme according to another embodiment of the present invention.

FIG. 4 shows, as an example, a schematic configuration with a system of a bank switching scheme comprising three memory banks. In FIG. 4, there is provided a memory bank C6 constituting a third memory bank, in addition to the configuration shown in FIG. 2. The memory bank C6 comprises a ROM. The memory banks A4, B5 and C6 store different processing programs.

There are provided a resistor AH for storing return bank designation data, a resistor AL for storing data for designating a memory bank which is the destination to be switched, and a register BX for storing a start address of a subroutine. The registers AH, AL and BX are provided in the CPU 1 as shown, or provided in a predetermined region in the main memory (RAM) 7. In general, resistors A, B, C, D and the like for temporarily storing data to be processed are provided in the CPU 1. The registers A to D are suitably used as the registers AL, AH and BX.

Figure 5:
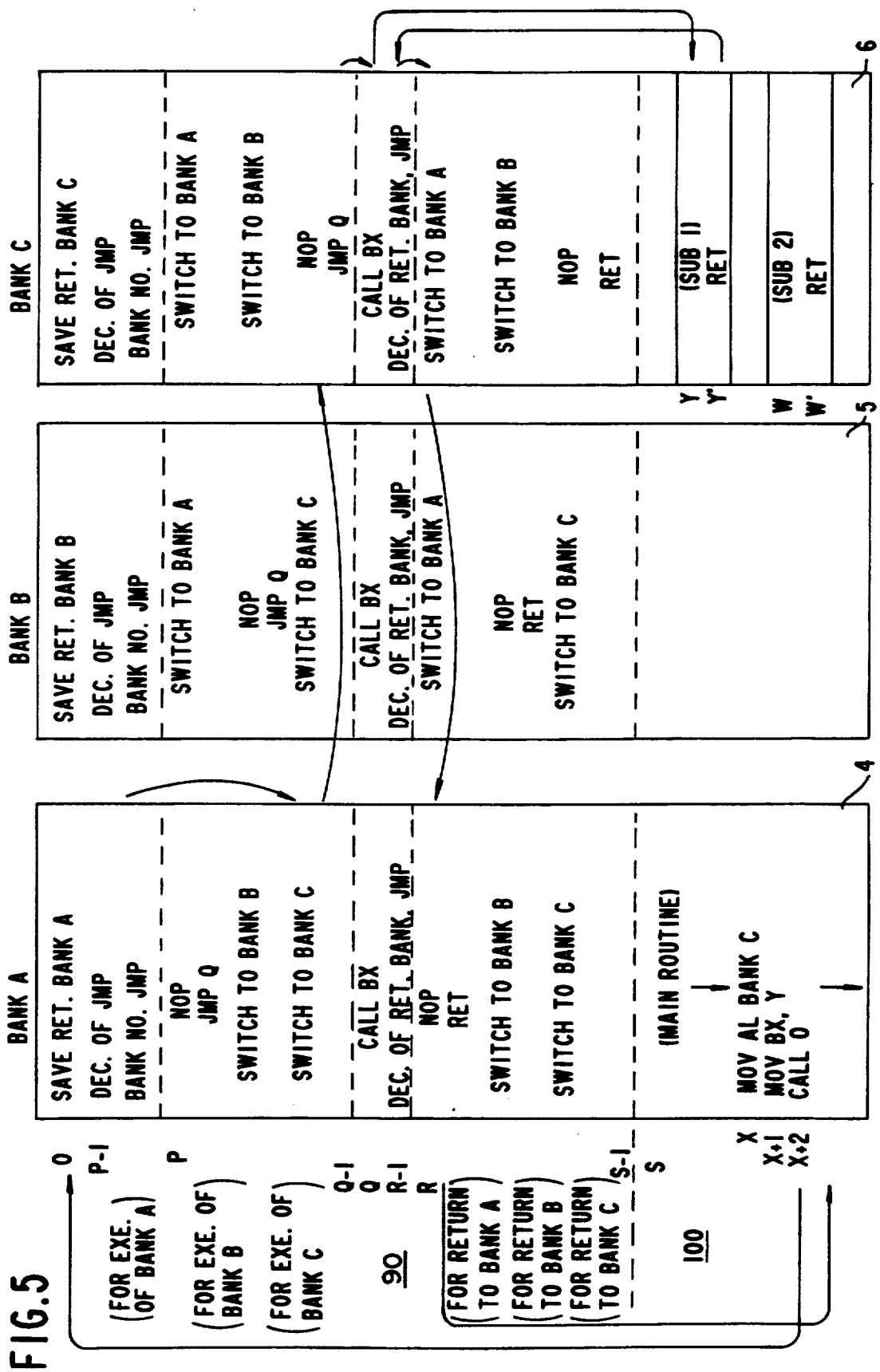
FIG. 5 is a diagram illustrating the content stored in a memory bank in a subroutine executing scheme using the system shown in FIG. 4.

FIGS. 5 shows an example of the contents respectively stored in memory banks. Each of the memory banks A4, B5 and C6 comprises a bank switching manager storing area 90 and a processing program area 100 for storing a predetermined program. The same particular area in each of the memory banks A4, B5 and C6, i.e., an area at addresses 0 to (S−1) is assigned to the bank switching manager storing area 90. An area in the remaining addresses in each of the memory banks A4, B5 and C6 is assigned to the processing program area 100. The memory banks A4, B5 and C6 respectively store different processing programs.

A bank switching manager roughly comprises first to fourth programs, which are respectively stored at addresses 0 to (P−1), addresses P to (Q−1), addresses Q to (R−1), and addresses R to (S−1).

In each of the banks A4, B5 and C6, the first program stored at the addresses 0 to (P−1) comprises an instruction for saving its own bank designation data in a predetermined register which is, for example, the register AH as return bank designation data, and an instruction for decoding jump designation data saved in the predetermined register such as the register AL and jumping to a corresponding address in the second program (as described below).

The second program stored in the addresses P to (Q−1) in each of the memory banks A4, B5 and C6 is used for actually switching to a jump bank. The second program comprises a combination of an NOP instruction and a JMP Q instruction and two bank switching instructions for switching the banks from its own bank to either one of the remaining two memory banks. In the second program, an instruction for switching to the bank A, an instruction for switching to the bank B and an instruction for switching to the bank C are respectively stored at the same addresses in the memory banks A, B and C. The NOP instruction is stored at the same addresses in the banks which are the destinations to be switched by the bank switching instructions.

The third programs at the addresses Q to (R−1) in the three memory banks are the same, each comprising an instruction for calling a subroutine starting at a jump address saved in the register BX and an instruction for decoding return bank designation data saved in the register AH to jump to a corresponding address in the fourth program (as described below).

The fourth program at the addresses R to (S−1) is a return program for actual switching to a return bank. The fourth program has almost the same scheme as that of the second program, but differs from the second program in that an RET instruction is stored in place of the JMP instruction.

When subroutines SUB 1 and SUB 2 are respectively stored in areas starting at addresses Y and W in the memory bank C6, description is now made on an operation for calling the subroutine SUB 1 in the memory bank C6 from the main routine in the memory bank A4. Briefly stated of illustration, it is assumed in the following description that this system is not of a pre-fetch scheme and an instruction is fetched every time the execution of the instruction is completed.

An MOV instruction for saving jump bank designation data (specifying the bank C6) indicating a memory bank storing the subroutine SUB 1 is stored in an address X in the memory bank A4. An MOV instruction for saving a start address of the subroutine SUB 1 in the register BX as a jump address is stored at an address X+1. A CALL instruction for calling a bank switching manager (a first program) starting at the address 0 is stored at an address X+2. It should be noted that the address X for calling a subroutine in the main routine and the start address of the subroutine SUB 1 are entirely independent of each other. Description is now made on the operation. Arrows in FIG. 5 represent the operation flow.

When processing of the main routine in the memory bank A4 proceeds and a program advances to the address X, jump bank (memory bank C6) designation data is stored in the register AL by the MOV instruction at the address X. At the address X+1, the start address Y of the subroutine SUB 1 is saved in the register BX. Subsequently, at the address X+2, the content of the address 0 in the memory bank A4 is called, so that the bank switching manager in the memory bank A4 is executed. In this bank switching manager, its own memory bank number A is saved in the register AH as return bank designation data. Then, a jumping bank number (in this case, the bank C) which has been already saved in the register AL is decoded, and then a jump takes place to a corresponding address in the second program in the memory bank A4. Since a jumping bank is the bank C6, a jump takes place to an address for executing the switching to the bank C in the second program, so that bank switching to the memory bank C6 is performed. In the memory bank C6, a JMP Q instruction is stored subsequent to the NOP instruction. On the other hand, an address pointer (not shown) for outputting an address to be executed is not changed in its content at all at the time of bank switching. Thus, an instruction to be executed after completion of bank switching is the JMP Q instruction in the memory bank C6. Consequently, the content of the start address Y of the subroutine SUB1 saved in the register BX is read out in accordance with the instruction CALL BX at the address Q, so that the subroutine SUB 1 is executed.

A return bank determining operation of the third program in the memory bank C6 is performed by an RET instruction at an address Y' after the execution of the subroutine SUB 1 is completed. In this return bank determining operation, return bank designation data saved in the register AH is first decoded, and a jump to a corresponding address of the fourth program in the memory bank C6 takes place in accordance with the result of the decoding. In this case, since the return bank is the memory bank A4, a jump to an instruction for switching to the bank A in the fourth program in the memory bank C6 takes place, so that switching is performed from the bank C6 to the bank A4.

After bank switching, the return to the main routine in the memory bank A4 is made by the RET instruction of the fourth program in the memory bank A4. The content of the bank register 8 is changed by the bank switching instruction under the control of the CPU 1 and the decoder 9 enables a corresponding memory bank in accordance with this changed content of the bank register 8, so that bank switching is achieved.

Furthermore, if and when the subroutine SUB 2 is called, it is necessary to save in the register BX the start address W of the subroutine SUB 2 by the MOV instruction at the address X in the memory A4.

Although in the above described embodiment, description was made on a case in which the subroutine in the memory bank C6 is called from the main routine in the memory bank A4, a subroutine in another memory bank can be naturally called from a main routine in any one of the memory banks.

In the above described manner, in a system with a memory bank switching scheme having a plurality of memory banks, a subroutine in an arbitrary memory banks can be called from a main routine in any memory bank and executed. In addition, troublesome address matching of the main routine and the subroutine is not required. Thus, the subroutine can be arranged at an arbitrary address, so that working efficiency in developing a program can be significantly improved.

Additionally, since bank switching can be accomplished in accordance with only a program stored in a particular address area, a program area for bank switching can be reduced.

Description is now made on a case in which the above described scheme, in which a bank switching program is stored in a particular address area in a memory bank, is applied to an interrupt handler.

Figure 6:
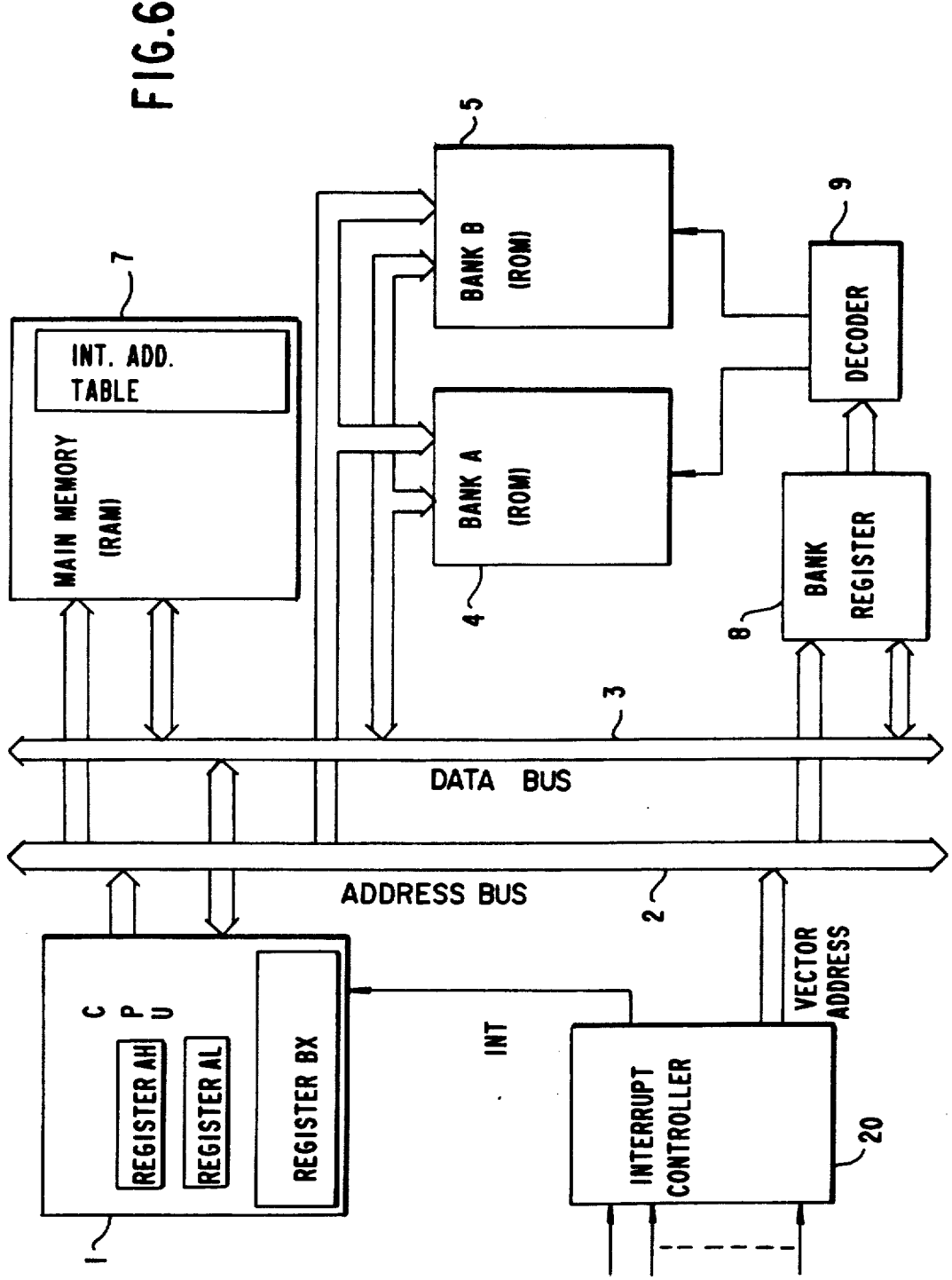
FIG. 6 is a diagram showing schematically a configuration of a system with bank switching scheme according to still another embodiment of the present invention.

FIG. 6 shows a main portion of a configuration associated with interrupt processing in a system with a memory bank switching scheme having two memory banks provided therein.

In FIG. 6, an interrupt controller 20 is provided, in addition to the configuration shown in FIG. 2. The interrupt controller 20 monitors various interrupt signals, generates a signal INT for indicating occurrence of an interruption to apply the same to the CPU 1 at the time of occurrence of an interruption, and sends out to an address bus 2 a vector address corresponding to the type of the occurring interruption.

An interrupt vector table storing a start address of each interrupt handler to be executed developed in a table form with respect to each vector address is stored in a predetermined area in the main memory 7. When an interruption occurs, the CPU 1 interrupts a processing program in execution and reads out a start address corresponding to the vector address from this table, to execute a subprogram starting at the address read out from this table.

Figure 7:
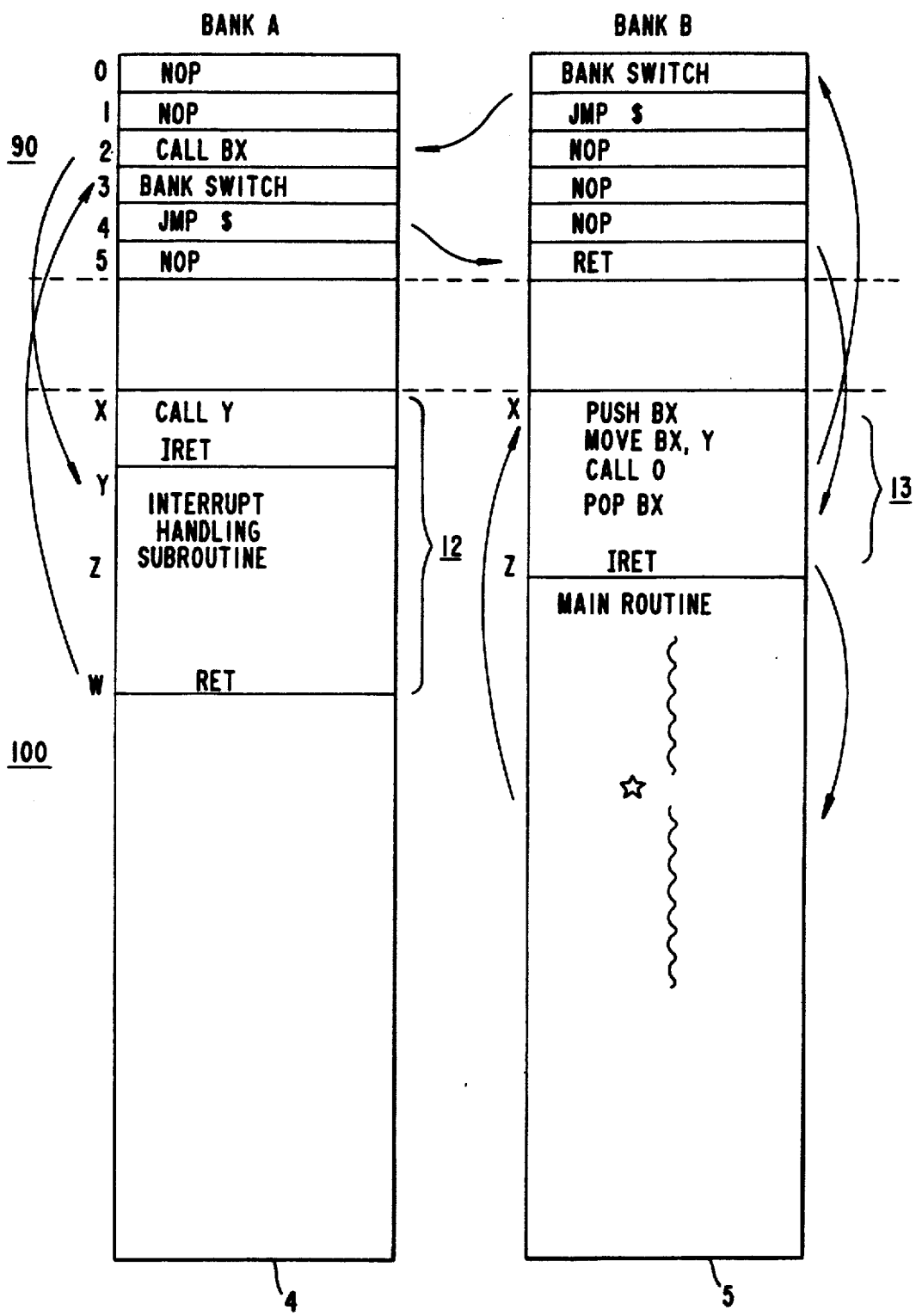
FIG. 7 is a diagram illustrating the content stored in each memory bank in an interrupt processing scheme using the system shown in FIG. 6.

FIG. 7 shows an example of a program stored in memory banks A and B. FIG. 7 shows only a program concerning a particular interruption out of a plurality of interruptions. In addition, it is assumed that an address X is designated to be executed in accordance with an interrupt vector table on the main memory 7 at the time of occurrence of this interruption.

Each of the memory banks A4 and B5 comprises an area 90 for storing a bank switching control program (bank switching manager) and an area 100 for storing a predetermined processing program. The same address area (addresses 0 to 5 in FIG. 7) in each of the memory banks A4 and B5 is assigned to the bank switching manager storing area 90.

The processing program area 100 in the memory bank A4 comprises an area (an area of addresses X to W) for storing an interrupt processing program 12 concerning a particular interruption and an area for storing a predetermined processing program. More specifically, an interrupt handling subroutine indicating the actual content of interrupt processing is stored in the area of the addresses Y to W in the memory bank A4, and a CALL instruction for calling this interrupt handling subroutine and an IRET instruction indicating the return from a subroutine to a main routine are respectively stored in the addresses X and X+1. A start address of the interrupt handling subroutine is the address Y. In addition, an RET instruction indicating the termination of a subroutine and the return to the main routine is stored at the address W.

In the memory bank B5, an interrupt control program 13 is stored at addresses X to Z. This interrupt control program 13 comprises a PUSH instruction for storing the content of the resistor BX in a stack (provided in the CPU 1), an MOV instruction for transferring to the register BX the start address Y of the interrupt handling routine, a CALL instruction for calling the bank switching manager starting at the address 0, a POP instruction for loading in the register BX the content stored in the stack, and an IRET instruction for returning from the interrupt handling subroutine to the main routine.

In the bank switching manager of the memory bank B5, an instruction for switching the banks from the bank B to the banks A, a JMP $ instruction, an NOP instruction, and an RET instruction are respectively stored at the address 0, the address 1, the addresses 2 to 4, the address 5.

In the bank switching manager for the memory bank A4, an NOP instruction, a CALL instruction for calling a routine starting at an address set in the register BX, and a JMP $ instruction for eternal loop are respectively stored at the addresses 0, 1 and 5, the address 2, and the address 4. Description is now made on the operation. In FIG. 7, the operation flow is represented by arrows.

It is assumed that an interruption occurs during the execution of the main routine in the memory bank B5 (at a point represented by the star mark in FIG. 7). A signal INT for indicating occurrence of an instruction is applied to the CPU 1 from the interrupt controller 20, and a vector address is sent out onto the address bus 2. The address X stored in the interrupt vector table in the main memory 7 is read out in accordance with this vector address, the content of the register BX is pushed into the stack, and an interrupt control program starting at the address X is executed by the CPU 1. More specifically, the start address Y of the interrupt subroutine is then transferred from the table to the register BX. Thereafter, the address 0 in the memory bank B5 is called so that the instruction at the address 0 is executed and then, the JMP $ instruction is executed. Consequently, the memory banks are switched from the bank B5 to the bank A4, and the CALL instruction at the address 2 in the memory bank A4 is executed. The address Y stored in the register BX is accessed by this CALL instruction, so that an interrupt handling subroutine starting at the address Y is executed. After the execution of this interrupt handling subroutine is completed, the return to an address subsequent to the address of the CALL instruction of the bank switching manager in the memory bank A4 is made by the RET instruction at the address W. The content of the address 3 which is the destination of the return is a bank switching instruction. The memory banks are switched from the bank A4 to the bank B5 by the bank switching instruction together with the JMP $ instruction at the address 4 and then, the RET instruction at the address 5 in the bank B5 is executed. A POP instruction stored at an address subsequent to the address of the CALL instruction in the program 13 in the memory bank B5 is executed by this RET instruction. Consequently, the content set in the stack is loaded in the register BX. The IRET instruction is executed after this loading, and the execution of an interrupted main routine in the memory bank B4 is resumed.

Similarly, with respect to another type of interruption, if an MOV instruction for transferring to the register BX a start address of an interrupt processing program to be executed is stored at a particular address (i.e., an address in a table corresponding to a vector address) designated by the interruption, processing of the interruption can be performed using the bank switching manager in the area 90.

Meanwhile, when an interruption occurs during processing of the main routine in the memory bank A4, an interrupt handling subroutine starting at the address Y is executed by the CALL instruction at the address X in the memory bank A4. After the execution of this interrupt handling subroutine is completed, the return to the original main routine is made by the RET instruction at the address W, so that the interrupt processing is resumed.

Additionally, in the interrupt control program 13, the transition to the address 0 may be made using the JMP instruction in place of the CALL instruction. In this case, it is necessary that the POP instruction and the IRET instruction are executed in the bank switching manager of the memory bank A4 and the return to the interrupted processing program in the memory bank B5 is made without through the interrupt control program 13 after bank switching is performed by the bank switching manager in the memory bank B5 so that the interrupt handling subroutine is executed. More specifically, the POP BX instruction, the bank switching instruction and the IRET instruction are stored at the addresses 3 to 5 in the area 90 in the bank A4.

Figure 8:
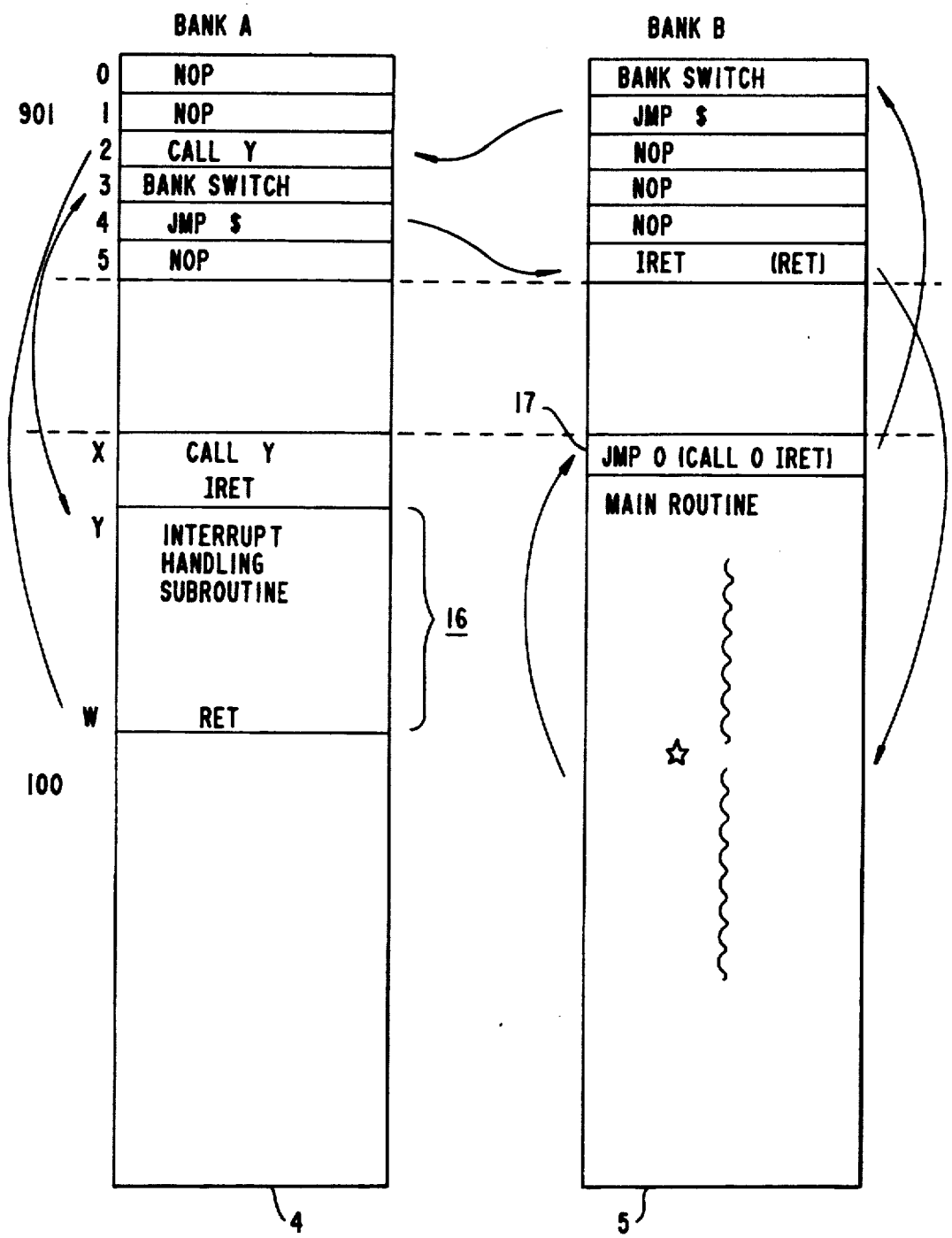
FIG. 8 is a diagram illustrating the content stored in each memory bank in another interrupt processing scheme using the system shown in FIG. 6.

Referring now to FIG. 8, description is made on another interrupt processing method. The method shown in FIG. 8 differs greatly from the method shown in FIG. 7 in two respects. The first respect is that an interrupt control program (13 in FIG. 7) for transferring to a predetermined register a start address of an interrupt handling subroutine to be executed is not stored in the method shown in FIG. 8. More specifically, in the method shown in FIG. 8, a bank switching manager in the memory bank B5 is immediately executed by a JMP instruction at an address X.

The second respect is to directly designate the address in calling the interrupt handling subroutine in the bank switching manager of the memory bank A4 in the method shown in FIG. 8. More specifically, the method shown in FIG. 8 differs from the method shown in FIG. 7 in that a predetermined register BX is not used and a CALL Y instruction is used in place of the CALL BX instruction. The schemes (or program structure) shown in FIGS. 7 and 8 are substantially the same except for the foregoing.

According to the method shown in FIG. 8, even if an interruption occurs during the execution of processing of a main routine in a memory bank B5, an interrupt handling subroutine in a memory bank A4 is executed after the banks are switched, and an interrupted main routine in the memory bank B5 is resumed after the execution of the interrupt handling subroutine, as in the method shown in FIG. 7.

In the method shown in FIG. 8, since a start address Y of the interrupt handling subroutine must be allocated in the bank switching manager, a bank switching manager stored in an area 90 cannot be utilized in common for other types of interruptions, so that bank switching managers must be respectively provided for possible interruptions. However, as compared with the method shown in FIG. 7, the number of processing steps is significantly decreased, as shown in FIG. 8.

Consequently, the time required for interrupt control can be reduced, which is effective in handling interruptions which frequently occur.

Meanwhile, the methods shown in FIGS. 7 and 8 can be naturally used in combination depending on the type of an interruption.

Additionally, although in the scheme shown in FIG. 8, the return to an interrupted processing program is made by an IRET instruction in a bank switching manager the memory bank B5, a scheme may be used in which a CALL O instruction is stored at an address X in the memory bank B4, as shown in a parentheses in FIG. 8, in place of the JMP O instruction, and the return to an interrupted processing program is further made using an RET instruction in place of the IRET instruction in the bank switching manager.

Description is now made on an interrupt processing method in a system with a memory bank switching scheme having three or more memory banks provided therein. As an example, let us consider a case in which three memory banks are provided.

Figure 9:
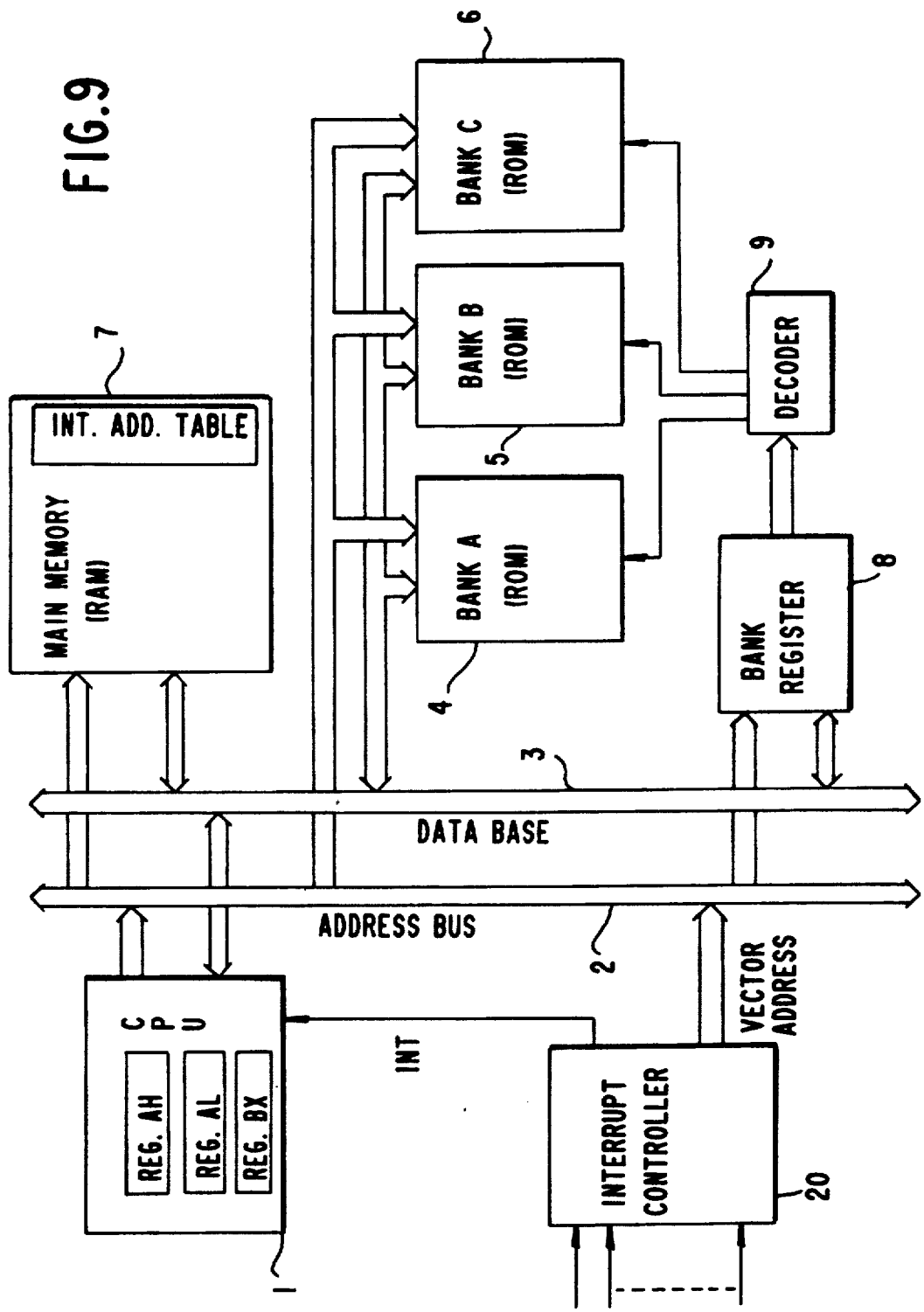
FIG. 9 is a diagram showing schematically a configuration of a system of a memory bank switching scheme according to a further embodiment of the present invention.

FIG. 9 shows a schematic configuration of the system. There is provided a memory bank C6 comprising a ROM, in addition to the configuration shown in FIG. 6. The bank register 8 stores bank designation data for designating any one of memory banks A4, B5 and C6. The decoder 9 decodes the bank designation data in the bank resistor 8, to enable only the corresponding designated memory bank. The other configuration is substantially the same as that shown in FIG. 6.

Figure 10:
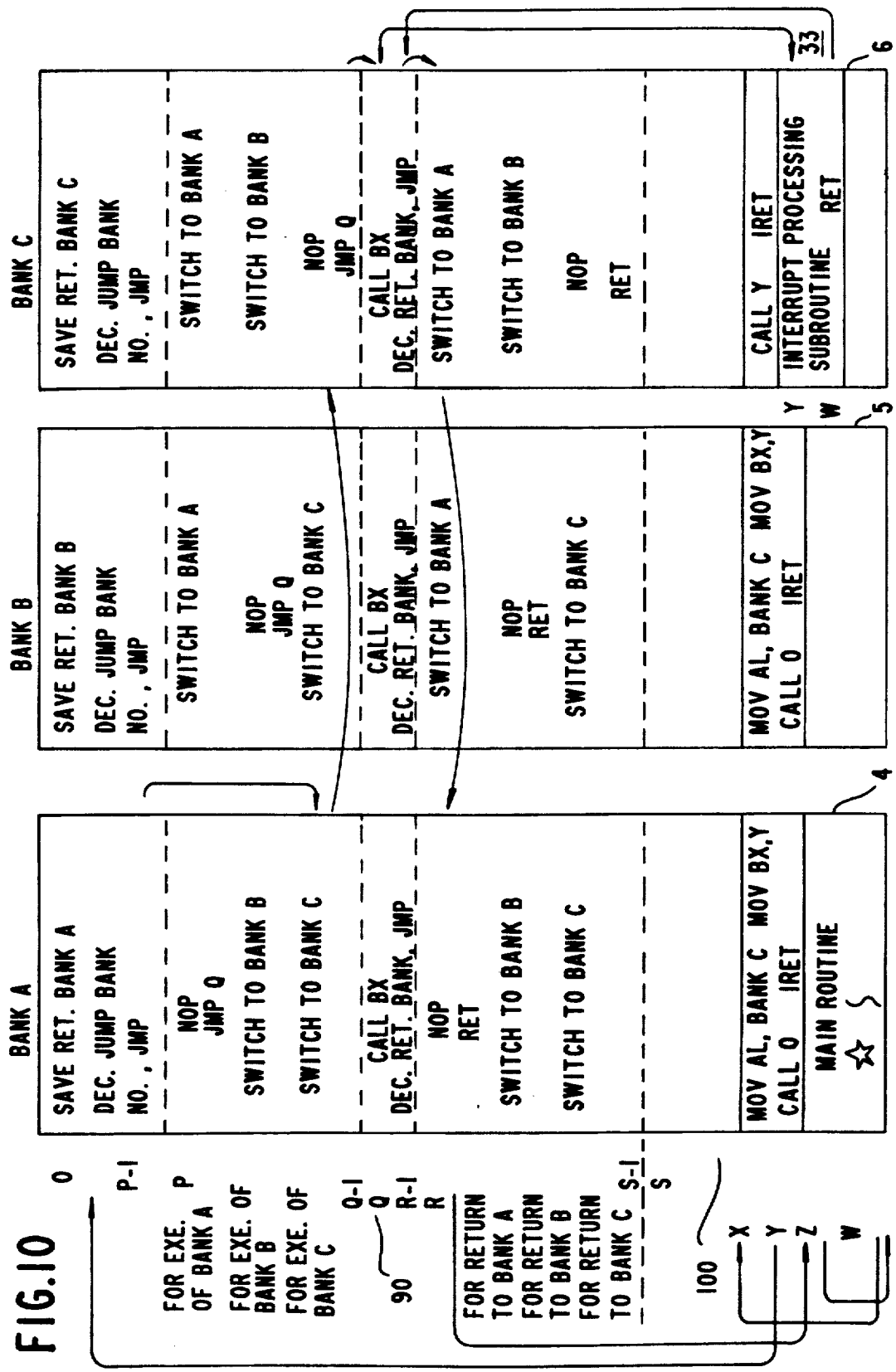
FIG. 10 is a diagram illustrating the content stored in each memory bank in an interrupt control scheme using the system shown in FIG. 9.

FIG. 10 is a diagram showing an example of the contents respectively stored in the memory banks A4, B5 and C6. FIG. 10 shows a scheme in which particular interrupt processing out of a plurality of interrupt processing is performed. A start address X of a subroutine for this particular interrupt processing is designated by an interrupt vector table developed in a predetermined region on the main memory 7. Since the main memory 7 is an RAM, this interrupt vector table is stored in a predetermined region of the main memory 7 in accordance with a bootstrap program when the system is powered on.

Referring to FIG. 10, each of the memory banks A4, B5 and C6 comprises a bank switching manager storing area 90 and a processing program area 100 for storing a predetermined processing program. The same address area in each of the memory banks A4, B5 and C6, i.e., an area at addresses 0 to (S−1) is assigned to the area 90.

A bank switching manager has the same scheme as that for executing the subroutine shown in FIG. 5. More specifically, the bank switching manager, the details of which are not repeated, comprises a first program stored in addresses 0 to (P−1) for setting a return bank and a jumping bank, a second program stored in addresses P to (Q−1) for actual bank switching to the jumping bank, a third program stored in addresses Q to (R−1) for setting a start address of an interrupt handling subroutine and determining the return bank, and a fourth program stored in addresses R to (S−1) for actual bank switching to the return bank.

An interrupt processing program 33 concerning a particular interruption is stored in an area at addresses X to W in the memory bank C. The interrupt processing program 33 has a CALL Y instruction stored at an address X, an IRET instruction stored at an address X+1, and an interrupt handling subroutine stored in addresses Y to W and indicating the content of actual interrupt processing. Description is now made on a processing operation to occur when an interruption occurs during the execution of a processing program in either one of the main banks A4 and B5. In FIG. 10, an example of the operation flow is represented by arrows.

If and when an interruption occurs during the execution of the processing program in the memory bank A4 or B5 (in FIG. 10, a case in which an interruption occurs at a point represented by the star mark in the memory bank A4 is shown by way of example), the address X is read out from the table in the main memory 7 in response to a vector address from the interrupt controller 20, so that the content of this address X is executed by the CPU 1. An area at addresses X to Z in each of the memory banks A4 and B5 stores an interrupt control program comprising an MOV instruction for saving in the register AL bank designating data BANK No. A having a corresponding interrupting processing program, an MOV instruction for saving in the register BX the first address Y of the interrupt handling subroutine, a CALL instruction for calling a bank switching manager, and an IRET instruction indicating the return to the interrupted address.

Thus, as represented by the star mark in FIG. 10, when an interruption occurs during the execution of the processing program in the memory bank A4, an interrupt control program starting at the address X in the memory bank A4 is first executed. More specifically, jump bank designation data BANK No.C and a jump address are respectively saved in the registers AL and BX, and the transition of the execution of the CPU 1 to the bank switching manager for the main memory A4 occurs after this saving. In the bank switching manager of the memory bank A4, its own memory bank number, i.e., the memory bank A is first saved in, for example, the resistor AH as return bank designation data. Subsequently, jump bank designation data saved in the register AL is decoded and then, a jump to a corresponding address in the second program takes place. In this case, since a jumping bank is the memory bank C6, a jump to an address for executing the memory bank C6 takes place and then, the banks are switched from the memory bank A to the memory bank C.

In the memory bank C6, a JMP Q instruction is stored following to an NOP instruction. Thus, after switching to the memory bank C6, an interrupt handling subroutine starting at the address Y stored in the register BX is called and executed. After the execution of the subroutine, a return address saved in the register AH is decoded in accordance with the RET instruction at the address W. In this case, since a return bank is the memory bank A4, a jump to an address for returning to the memory bank A takes place, so that bank switching to the memory bank A4 is performed. After the bank switching, the return to the interrupt control program (IRET instruction) in the memory bank A is made by an RET instruction in the memory bank A4, so that the return to a processing program which is executed before the interruption is made through this control program.

Meanwhile, the same processing is performed when the above described particular interruption occurs during the execution of the processing program in the memory bank B5. In addition, when this particular interruption occurs during the execution of a processing program in the memory bank C6, an interrupt handling subroutine is executed by the CALL instruction at the address X. After the execution of this interrupt handling subroutine, the return to the original interrupted processing program is made by the RET instruction and the IRET instruction, to resume the interrupted processing program.

In the above described scheme, bank switching can be performed from an arbitrary bank to an other arbitrary bank in accordance with bank switching manager stored in the same address area of the banks. Thus, if, with respect to an interrupt processing program stored in another memory bank and another type of interruption, an interrupt control program for saving jumping bank designation data and/or a jumping address for an interrupt handling program to be executed in the register AL and/or the register BX is stored at a particular address designated by the interruption, interrupt control can be performed utilizing in common the bank switching manager stored in the area 90.

Figure 11:
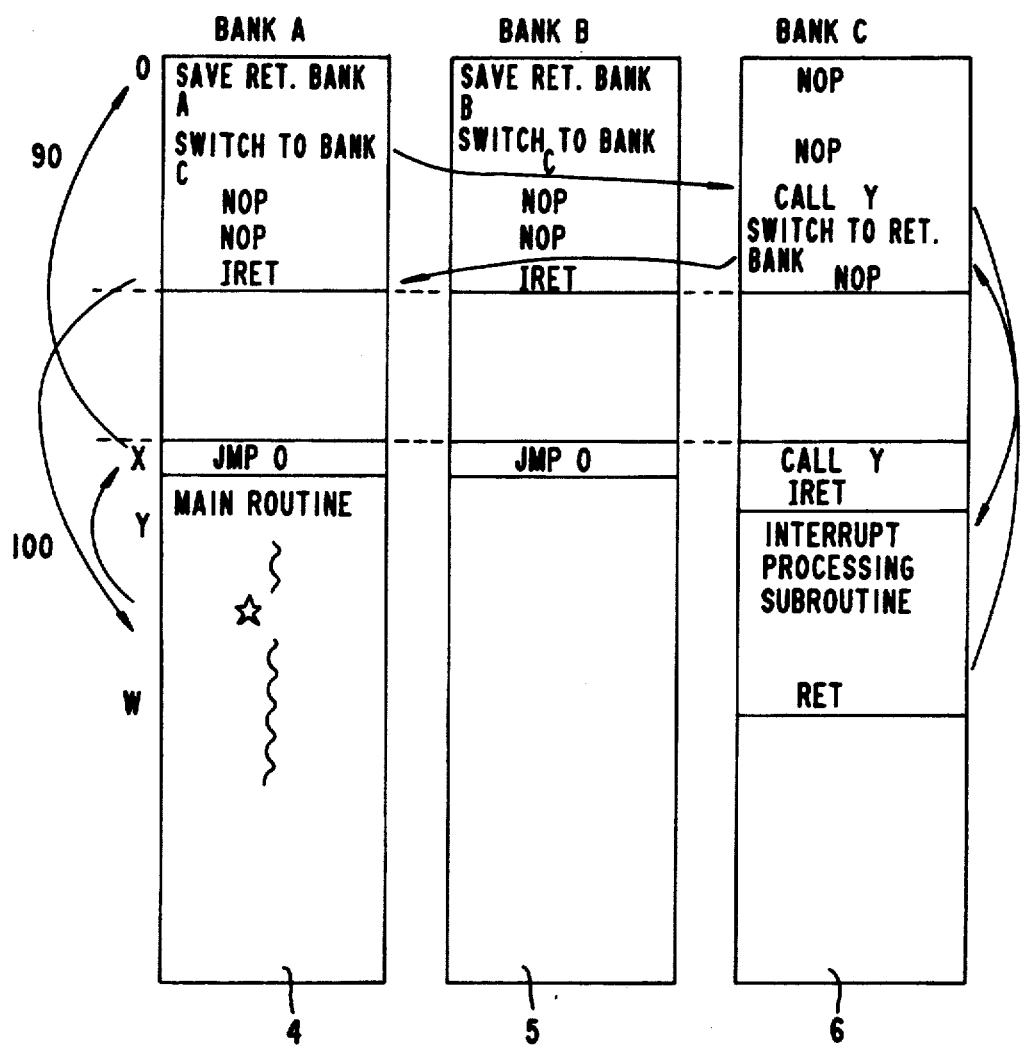
FIG. 11 is a diagram illustrating the content stored in each memory bank in another interrupt control scheme using the system shown in FIG. 9.

FIG. 11 shows a scheme in which the scheme shown in FIG. 8 is applied to a system having three memory banks. In the scheme shown in FIG. 11, a bank switching manager is provided for a particular interruption only, as in the scheme shown in FIG. 8. More specifically, jump bank designation data and a jumping address (a first address of an interrupt handling subroutine) for bank switching are respectively fixedly stored in a memory bank C6 and an address Y in a bank switching manager of each of the memory banks. In this scheme, if an interruption occurs during the execution of a processing program in the memory bank A4 (a point represented by the star mark in FIG. 11), the transition to the bank switching manager of the memory bank A4 immediately occurs by JMP 0 at an address X. After saving a data for designating the bank A4 as a return bank, switching to the memory bank C6 is uniquely performed. After the bank switching, the address Y is directly designated by CALL Y instruction, so that an interrupt handling subroutine is called. After the execution of this handling subroutine is completed, switching to the return bank is performed. After switching to the return bank, the return to an interrupted processing program is made by an IRET instruction included in the bank switching manager of the memory bank A4.

In this scheme, the same bank switching manager cannot be used in common for all interruptions, unlike the previously described scheme. However, the number of processing steps is significantly decreased, so that the time required for interrupt control can be reduced.

Meanwhile, in order to utilize a bank switching manager in common for a plurality of types of interruptions as far as bank switching to the same memory bank is concerned, it is necessary to store an MOV BX, Y instruction, a CALL 0 instruction and an IRET instruction in an area starting at the address X in place of the JMP 0 instruction at the address X, and respectively to store RET instruction and CALL BX instruction in place of the IRET instruction and the CALL Y instruction in the bank switching manager. More specifically, the first address of the interrupt handling subroutine is stored in a register BX before the transition to the bank switching manager after generation of an interruption, and the content of the register BX is called to execute the interrupt handling subroutine after bank switching by the bank switching manager. Consequently, even if a plurality of types of interrupt handling subroutines are stored only in the memory bank C6, for example, interrupt processing can be performed without increasing the number of bank switching managers. In this case, a plurality of control programs begining at the address X in each of the memory banks A4 and B5 are provided corresponding to the plurality of interrupt processings.

Meanwhile, in a system having four or more memory banks therein, the number of the above described bank destination data is only increased. Thus, the system can be easily extended to a system having four or more memory banks therein.

According to the above described scheme, in a system with a bank switching scheme, a bank switching manager is stored in the same address area in each of memory banks and bank switching is performed in accordance with this bank switching manager, so that required interrupt processing can be performed. Thus, in a system in which a common memory area cannot be provided external to memory banks, even if an interruption occurs during the execution of a processing program in an arbitrary memory bank, interrupt processing can be performed utilizing an interrupt handling program stored in a particular memory bank and an interrupted processing program can be resumed. Consequently, a large memory area can be used as a program area for storing a main processing program, so that the memory area can be efficiently utilized. Thus, long processing programs and desired and required processing programs are all stored in the memory bank.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for executing a subprogram in a data processing system having a plurality of memory banks (4, 5, 6) and having facility of expanding storage capacity of the system by switching said memory banks, said subprogram comprising either one of a subroutine and an interrupt handling routine, wherein each of said plurality of memory banks comprises a first memory area (100) for storing a predetermined processing program, said predetermined processing program differing in each said plurality of memory banks, and at least one (6) of said plurality of memory banks stores said subprogram in said first memory area, the memory banks (4, 5) excluding at least one memory bank for storing said subprogram comprises a second memory area (90) for storing a first control program for selecting a memory bank for storing said subprogram when said subprogram must be executed during the execution of a processing program in the first memory area and a second control program for returning to the processing program requiring said subprogram after the execution of said subprogram is completed, the memory bank (6) for storing said subprogram to be executed comprises a third memory area (90) for storing a third control program for calling said subprograms to be executed and a fourth control program for selecting a memory bank for storing said processing program requiring said subprogram to be executed after the execution of said subprogram to be executed is completed, and said second memory area and said third memory area are respectively provided in memory areas to which same addresses are assigned in said plurality of memory banks.

2. The subprogram executing apparatus according to claim 1, wherein said subprogram is an interrupt handling routine, and further comprises means (20) for generating a vector address associated with a generated interruption, and means (7) for developing a start address of an interrupt control program for calling said interrupt handling routine in a table with respect to said vector address and storing said start address, said interrupt control program being stored in said first memory area, said interrupt handling routine being stored in a particular memory bank out of said plurality of memory banks.

3. The subprogram executing apparatus according to claim 1, wherein said plurality of memory banks comprises a first memory bank for storing a subprogram to be executed and a second memory bank provided separately from said first memory bank for storing a first processing program executed before the execution of said subprogram to be executed, said second memory area in said second memory bank stores an instruction for switching the memory banks from said second memory bank to said first memory bank and an instruction for returning to said first processing program, said third memory area in said first memory bank includes an instruction for calling said subprogram to be executed and an instruction for switching the banks from said first memory bank to said second memory bank.

4. The subprogram executing apparatus according to claim 1, wherein said second and third memory areas in each of said plurality of memory banks stores a first program for setting a memory bank to be returned after the execution of said subroutine to be executed is completed, a second program for switching the memory banks to the memory bank including said subroutine to be executed, said memory bank including said subroutine to be executed being determined by a main routine in execution, a third program for calling said subroutine to be executed, and a fourth program for switching the memory banks to said memory bank set by said first program, said first to fourth programs being respectively stored in area having same addresses assigned in each of said memory banks.

5. The subprogram executing apparatus according to claim 2, wherein said third memory area in said particular memory bank comprises an instruction for calling said subprogram to be executed and an instruction for switching the memory bank to a return bank, and each of said second memory areas in the memory banks excluding said particular memory bank comprises an instruction for setting an identifying information for specifying the memory bank in which each of said second memory areas is located as information for specifying said return bank and an instruction for switching the memory banks to said particular memory bank.

6. A method for executing a subprogram in a data processing system having a plurality of memory banks such storing a processing program, comprises the steps of:

providing a plurality of memory banks (4, 5, 6) in said data processing system, each having a bank switching control program stored in a first address area, and a processing program stored in a second address area, said first address area in each memory bank being a same address area as any other memory bank of said plurality of memory banks;

switching the memory banks according to said bank switching control program said switching step including the steps of:

(a) reading out a bank switching control program stored in said first area of a first memory bank of said plurality of memory banks, when a processing program stored in said second address area of the first memory bank requires a subprogram in a processing program stored in said second address area if a second memory bank, and (b) switching the banks from the first memory bank to the second memory bank and reading out a bank switching control program stored in said first address area of said second memory bank in accordance with the bank switching control program read out from the first memory bank; and calling and executing said required subprogram in said second address area of the second memory bank in accordance with the bank switching control program read out from the memory bank.

7. A method for executing a subprogram in a data processing system having plurality of memory banks each including a bank switching control program stored in a first address area, and a processing program stored in a second address area, said first address area of each of said memory banks being a same address area as in any other memory bank of said plurality of memory banks, wherein said plurality of memory banks comprises first and second memory banks (4, 5), said method comprising the steps of:
- saving a first address of a required subprogram in particular storing means (BX) when a main routine in a processing program stored in said first memory bank requires said subprogram stored in said second memory bank,
- reading out a bank switching control program stored in said first memory bank,
- switching the banks from said first memory bank to said second memory bank and reading out a bank switching control program in said second memory bank in accordance with said bank switching control program read out from the first memory bank,
- calling the first address stored in said particular storing means and executing said required subprogram in accordance with said bank switching control program read out from the second memory bank,
- after completion of the execution of said required subprogram reading out the bank switching control program in said second memory bank, switching the memory banks from said second memory bank to said first memory bank and reading out the bank switching control program in said first memory bank in accordance with the read out bank switching control program in said second memory bank, and
- returning to said main routine in accordance with said bank switching control program read out from said first memory bank.

8. A method for executing a subprogram in a data processing system having a plurality of memory banks each including a bank switching control program stored in a first address area, and a processing program stored in a second address area, said first address area of each of said memory banks being a same address area as in any other memory bank of said plurality of memory banks, wherein said memory banks comprises at least first, second and third memories (4, 5, 6), said method comprising the steps of:
- when a main routine in the processing program stored in said first memory bank requires the subprogram stored in said second memory bank, storing information for designating said second memory bank and the first address of said required subprogram in predetermined first storing means (AL, BX) and reading out the bank switching control program in said first memory bank by an instruction in said main routine,
- storing information for specifying said first memory bank in predetermined second storing means (AH), switching the memory banks from said first memory bank to said second memory bank in accordance with said stored information for specifying the second memory bank, and reading out the bank switching control program in said second memory bank, in accordance with said first switching control program read out from said first memory bank,
- calling said subprogram based on the stored first address of the subprogram, in accordance with said bank switching control program read out from said second memory bank,
- executing said called subprogram, reading out the bank switching control program in said second memory bank after completion of the execution of said called subprogram, and switching the memory banks form said second memory to said first memory bank based on said stored information for specifying the first memory bank and reading out the bank switching control program in said first memory bank in accordance with said bank switching control program read out from said second memory bank, and
- returning to said main routine in accordance with said bank switching control program read out from said first memory bank.

9. A method for executing a subprogram in a data processing system having a plurality of memory banks each including a bank switching control program stored in a first address area, and a processing program stored in a second address area, said first address area of each of said memory banks being a same address area as in any other memory bank of said plurality of memory banks, wherein said subprogram is an interrupt handling subroutine, said plurality of memory banks comprises a first memory bank (4) for storing said interrupt handling subroutine (12) and a second memory bank (5) for storing an interrupt control program (13) for storing a first address of said interrupt handling subroutine in predetermined storing means (BX), and which comprises the steps of:
- when an interruption occurs during the execution of a processing program in said second memory bank, interrupting said processing program in execution and making the transition to said interrupt control program,
- storing a first address of an interrupt handling subroutine associated with the occurring interruption in said predetermined storing means and reading out the bank switching control program in said second memory bank, in accordance with said interrupt control program,
- switching the memory banks from said second memory bank to said first memory bank and reading out the bank switching control program in said first memory bank, in accordance with said read out bank switching control program in said second memory bank,
- calling said associated interrupt handling subroutine based on information of the first address stored in said predetermined storing means, in accordance with said bank switching control program read out from said first memory bank,
- executing said called interrupt handling subroutine and making the transition of the execution to said bank switching control program in said first memory banks after completion of the execution of said called interrupt handling subroutine,
- switching the memory banks from said first memory bank to said second memory bank and reading out the bank switching control program in said second memory bank, in accordance with said bank switching control program in said first memory bank, and
- returning to said interrupted processing program in accordance with said bank switching control program read out from said second memory bank.

10. A method for executing a subprogram in a data processing system having a plurality of memory banks each including a bank switching control program stored in a first address area, and a processing program stored in a second address area, said first address area of each of said memory banks being a same address area as in any other memory bank of aid plurality of memory banks, wherein said subprogram includes a plurality of interrupt processing routines, and said plurality of memory banks comprises a first memory bank (4) for storing said interrupt processing routine (16) and a second memory bank including an instruction (17) for reading out said memory bank switching control program, and which comprises the steps of:

when an interruption occurs during the execution of the processing program in said second memory bank, interrupting the processing program in execution, executing said instruction for reading to read out said bank switching control program in said second memory bank, switching the memory banks from said second memory bank to said first memory bank and reading out the bank switching control program in said first memory bank, in accordance with said bank switching control program read out from said second memory bank, calling an interrupt processing routine associated with said interruption which occurred and executing the same, in accordance with said bank switching control program read out from said first memory bank, returning to the bank switching control program in said first memory bank after the execution of said interrupt processing routine is completed, switching the memory banks from said first memory bank to said second memory bank and reading out said bank switching control program read out from said second memory banks in accordance with the bank switching control program in said first memory bank, and returning to said interrupted processing program in accordance with said bank switching control program read out from said second memory bank.

11. The subprogram executing method according to claim 10, wherein the instruction for reading out the bank switching control program in said second bank memory is provided for each of a plurality of interrupt processings, and each of the bank switching control programs in said first and second memory banks has a plurality of bank switching control routines corresponding to each of said plurality of interrupt processing, wherein at least one of said plurality of bank switching control routines is executed when an interruption occurs.

12. A method for executing a subprogram in a data processing system having a plurality of memory banks each including a bank switching control program stored in a first address area, and a processing program stored in a second address area, said first address area of each of said memory banks being a same address area as in any other memory bank of said plurality of memory banks, wherein said plurality of memory banks comprises at least a first memory bank (6) for storing an interrupt processing program for dealing with an interruption which occurred and second and third memory banks (4, 5) each for storing an interrupt control program, and which comprises the steps of:

when a request for an interruption occurs during the execution of a processing program in either one of said second and third memory banks, interrupting the execution of said processing program in execution and making the transition to the execution of the interrupt control program in said one of said second and third memory banks, storing in the first storing means (AL, BX) at least one of information for specifying said first memory bank storing said interrupt processing routine and the first address of said interrupt processing routine and making the transition of a processing step to said bank switching control program in said one memory bank, in accordance with the interrupt control program in said one memory bank, storing in the second storing means (AB) the information for specifying said one memory bank, switching the memory banks from said one memory bank to said first memory bank and reading out the bank switching control program in said first memory bank, in accordance with said bank switching control program in said one memory bank, calling said interrupt processing routine in accordance with the bank switching control program in said first memory bank, executing said called interrupt processing routine, and returning to said bank switching control program in said first memory bank after that execution is completed, switching the memory banks from said first memory bank to said one memory bank based on the information for specifying said one memory bank stored in said second storing means and reading out said bank switching control program in said one memory bank, in accordance with said returned bank switching control program in said first memory bank, and returning to said interrupted processing program in accordance with said bank switching control program read out from said one memory bank.

13. The subprogram executing method according to claim 12, wherein the step of storing in said first storing means comprises the step of storing both said first memory bank specifying information and the first address of said interrupt processing routine, and the step of switching the memory banks from said one memory bank to said first memory bank comprises the step of decoding the memory bank specifying information stored in said first storing means.

14. The subprogram executing method according to claim 12, wherein said interrupt processing program is stored only in a single memory bank out of said plurality of memory banks, and the step of storing in said first storing means (BX) comprises the step of storing only the first address of said interrupt processing routine.

15. The subprogram executing method according to claim 12, wherein said interrupt control program comprises a plurality of interrupt control programs provided corresponding to the plurality of interrupt processing, and the step of making the transition of the execution to said interrupt control program comprises the steps of outputting a vector address associated interrupt with an interruption which occurred, reading out a first address of an associated control program out of addresses developed in a table based on said vector address, and calling the associated interrupt control program based on said read out first address.

16. A method for executing a subprogram in a data processing system having a plurality of memory banks each including a bank switching control program stored in a first address area, and a processing program stored in a second address area, said first address area of each of said memory banks being a same address area as in any other memory bank of said plurality of memory banks, wherein said plurality of memory banks comprises at least a first memory bank (6) for storing an interrupt processing program for handling an interruption which occurred and second and third memory banks (4, 5) different from said first memory bank, and which comprises the steps of:

when an interruption occurs during the execution of a processing program in either one of said second and third memory banks, interrupting said processing program in execution and making the transition of the execution to the bank switching control program in said one memory bank, storing information for specifying said one memory bank in storing means (AL or AH) and switching the memory banks from said one memory bank to said first memory bank in accordance with the bank switching control program in said one memory bank, and reading out the bank switching control program in said first memory bank after that switching, calling said interrupt processing program in accordance with said banks switching control program in said first memory bank, executing said called interrupt processing program and returning to the bank switching control program in said first memory bank after that execution, switching the memory banks from said first memory bank to said one memory bank and reading out said bank switching control program in said one memory bank based on said bank specifying information stored in said storing means, in accordance with the bank switching control program in said first memory bank, and returning to said interrupted processing program in accordance with the bank switching control program in said one memory bank.

17. The subprogram executing method according to claim 16, wherein said interrupt processing program comprises a plurality of types of interrupt processing programs, and said bank switching control program has a plurality of bank switching routines, one for each of said plurality of types of interrupt processing programs, each of said plurality of bank switching routines being stored in the same address area of said first, second and third memory banks, and the step of making the transition of the execution to the bank switching control program when said interruption occurs comprises the steps of:

outputting a vector address for specifying the interruption which occurred, reading out a corresponding address from addresses developed in a table based on said vector address, reading out from said first area a control instruction stored in a location at the read-out address, and reading out a corresponding control routine from said plurality of bank switching control routines and executing said corresponding control routine in accordance with said read-out control instruction.

* * * * *